Patented Mar. 12, 1935

1,994,377

UNITED STATES PATENT OFFICE 1,994,377

REFRACTORY MATERIAL AND METHOD OF MAKING THE SAME

Clyde E. Williams and John D. Sullivan, Columbus, Ohio, assignors to The Battelle Memorial Institute, Columbus, Ohio, a corporation of Ohio No Drawing. Application April 28, 1933, Serial No. 668,417

19 Claims. (Cl. 106—9)

Our invention relates to refractory material and method of making the same. It has to do, particularly, with the making of such products for use in connection with metallurgical operations, though it is not necessarily limited thereto.

In the prior art, it is more or less common practice to line melting furnaces with refractory bricks, such as ordinary fire bricks. Sometimes, the lining is made of crushed rammed refractories with binders or with refractory cement. These practices have several drawbacks, among which are the relatively low melting of the lining and the acidic nature thereof.

Magnesite brick is used to some extent and has the advantage of being basic. However, it tends to spall badly if heated or cooled rapidly. Also, it is quite expensive.

Chrome brick is sometimes used as a basic refractory. But this material is expensive and it is actually a neutral rather than a basic refractory. Furthermore, it often reacts with and is injurious to the product being made.

Small furnaces or parts of large furnaces are sometimes lined with alundum or chrome cement. Both of these require inorganic binders such as clay or sodium silicate, to make them cementitious and, consequently, their refractoriness is lowered. Moreover, they are not basic refractories.

In some cases, mullite cement is used. However, this is not basic and it requires a binder that lowers its refractories. It is also too expensive for most purposes.

Ladles are usually lined with refractory brick, rammed crushed refractories or refractory cement. It is also customary to make linings for ladle nozzles and nozzle stoppers of refractory brick or refractory cement. Lips for pouring are usually made of refractory brick or refractory cement or both. Crucibles are made in various sizes and shapes from clay, magnesia, alundum and other materials.

The use of refractory cements for patching or for making linings has heretofore been subject to severe limitations. One reason is that acidic materials have been relied upon, since there has been no cheap basic highly refractory cement available.

Granular magnesite, electrically sintered or fused magnesite, raw dolomite, calcined dolomite, and dolomite sintered with such materials as iron oxide and clay to prevent their slaking in moist air have been used as patching materials. These, however, must be sintered into place at high temperatures, often with slag and other agents to cause them to fuse in place or to set.

Likewise, calcined magnesite or dolomite mixed with tar, sodium silicate or some other binder has been used for patching or making furnace bottoms or walls. However, these materials are not dense enough or sufficiently adherent to remain in place for an adequate period of time.

One of the objects of this invention is to make a hydraulic cement which may be used either at ordinary or elevated temperatures.

Another object of this invention is to provide a material that may be readily applied for lining or patching a metallurgical container or similar article.

Another object of our invention is to provide a material that may be converted readily into a monolithic product that will be both highly refractory and basic and that will be otherwise suitable for lining or patching metallurgical articles.

Still another object of our invention is to provide a material that may be used in the making of seamless linings or making of blocks or bricks for lining or patching articles of the type indicated.

Another object of our invention is the making of blocks or bricks of basic and highly refractory materials.

Still another object of our invention is the making of a highly refractory basic product which, while having these qualities, is also of low density.

A further object of this invention is to provide a suitable method of making products of the type indicated at a low cost in comparison with prior art products designed for the same or a similar purpose.

This application is a continuation in part of our application, Serial No. 626,170, filed on July 28, 1932.

In the preferred form of our invention, we proceed with the making of our product by taking natural occurring dolomite, adding the necessary fluxes thereto, and clinkering these mixed raw materials which are preferably crushed to pass through a 100-mesh screen. The clinkering may be effected in a rotary kiln, such as that used to make ordinary Portland cement though, of course, other methods of clinkering may be utilized.

It should be understood that the dolomite which is used in the formation of the clinkers is not necessarily pure dolomite. It is only essential that it be calcareous material containing appreciable quantities of magnesium carbonate. Silica should be present in the charge of raw materials and a metal oxide fluxing agent like iron oxide should be present. However, metal oxide fluxing agents like aluminum oxide or other metallic oxide such as manganese, chromium, et cetera, may be substituted in approximately equivalent ratios for iron oxide. The silicious material initially present in the mixture may be common sand and the ferrous material may be mill scale, iron ore or the like. Clay may be used as the source of aluminum oxide. If either clay or iron ore containing silica is used, this silica acts as part of that necessary to make the proper charge.

It is important that the dolomite clinker formed be substantially stable against slaking or dusting. This will be insured by the use of the proper ingredients in proper proportion and by firing at a proper temperature for a proper period of time, the time depending somewhat upon the type of firing apparatus used. While methods for making dolomite clinker are known, use of the correct amounts of iron or other oxide, and silica added as fluxes to avoid slaking and dusting is not commonly practiced. Slaking is caused by the presence of free lime and dusting is caused by the conversion of beta to gamma dicalcium silicate. This conversion takes place at about 675° C. during cooling of the clinker.

Clinkers made from a raw batch mixture containing less than five per cent of silica are ordinarily unstable, owing to slaking. Clinkers made from a raw batch mixture containing over 8% to 12% of silica, the limit depending on the amount of iron or other oxide present, are unstable, owing to dusting. Between the slaking and dusting fields lies the stable range of clinker.

It is found that any clinker made by using 5% to 8% of silica in the raw materials is stable if the iron oxide content expressed as $Fe_2O_3$, is above 2%. The limits of amounts of silica and iron oxide in the making of stable clinkers are broad enough to make manufacturing control easy and practicable.

The percentage of flux added is based on the weight of raw materials used and not on the percentages found in the clinkered product. For example, if we specify 7% of silica and 7% of ferric oxide as fluxes, we refer to the percentages of the fluxes in the raw materials and mean that the mixture before burning and clinkering consisted of 86% of dolomite, 7% of silica and 7% of ferric oxide.

Compositions of raw materials having the following percentages of fluxes, when subjected to proper temperatures for proper periods of time, will yield stable clinkers: 5% of silica and 3% to 15% of iron oxide, expressed as $Fe_2O_3$; 6% of silica and 1% to 15% of iron oxide; 7% of silica and 0.5% to 15% of iron oxide; 8% of silica and 0.5% to 10% of iron oxide; 9% of silica and 1% to 5% of iron oxide; 10% of silica and 1% to 3% of iron oxide; and 11% of silica and 2% of iron oxide. It is understood that it is not necessary to use integral percentages of silica and iron oxide. Fractional percentages can be used. It is also understood that equivalent amounts of aluminum or other oxides can be used to replace the iron oxide without appreciably changing the limits outlined. Clinkers made from compositions of raw material containing from 6% to 9% of silica and 2% to 5% of iron oxide are especially suitable.

The above percentages are merely given as examples of combinations which will yield stable clinkers and it should be understood that our invention is not necessarily limited to the use of clinkers formed from mixtures having the fluxes in the proportion indicated by these examples. The essential thing is that we obtain a clinker which is stable against dusting and slaking and our invention covers the use of clinkers which may be made from the entire range of composition of dolomite, silica and iron or other acidic oxide, providing the clinkered material is stable against slaking and dusting.

As a matter of fact, when dolomite and the requisite amount of fluxes containing silica and iron or other oxide, are put through the regular operations of cement manufacture, the product emerges as a granular clinker which consists essentially of periclase, tricalcium silicate, and calcium ferrite, or calcium aluminate, if aluminum oxide is used instead of iron oxide. This product is especially characterized by its high content of tricalcium silicate, its low content of dicalcium silicate, and its crystals of free periclase. It is further characterized by the fact that nearly all the silica therein is present as tricalcium silicate and enough iron is present to stabilize the beta dicalcium silicate. It is understood, of course, that although the regular operations of cement manufacture may be followed, the time and temperature of firing need not be the same. The temperature used for forming the periclase will vary, depending upon the impurities present and upon the time of application of the temperature. It is preferably in excess of 2500° F. It is well known in the art that the temperature required is dependent upon the impurities present.

The second step in the performance of our process involves the grinding of the stable dolomite clinker until it becomes a finely ground powder. It has been found that this finely ground powder is a stable hydraulic cement which is highly refractory and basic in its nature and which can be used to great advantage in the metallurgical industry and in other industries.

A third step in our process consists in mixing the ground clinker with water in much the same manner as in the case of Portland cement. The cement sets somewhat more slowly than Portland cement. Its rate of setting depends, to some extent, on the history of the clinker and its composition. Some cements set in 24 hours, while others require 48 hours before they acquire much strength. Maximum strength is not obtained for quite a time. Good strength is obtained in seven days and the aging is nearly finished in a month, although the strength continues to increase even beyond this point. During the setting period, it is necessary to keep the cement moist.

The following data will give a picture of the strength of dolomite cement pieces made from powder (dry cement) and water:

| Age days | Crushing strength lbs./sq. in. |
| --- | --- |
| 1 | 160 |
| 2 | 575 |
| 3 | 1030 |
| 28 | 2500 |

It will be understood, of course, that the above figures are given only as examples, and that the strength will vary somewhat with the percentage, ratio and kind of fluxes used.

The cement may be mixed with other and coarser material. For example, coarser particles of magnesium oxide or dolomitic clinker can be used in the same manner that sand and gravel are used with Portland cement to make concrete. The "concrete" may be poured into a suitable holder or mold and allowed to set or it may be applied to a furnace wall as a paste. During the setting period, the "concrete" should be kept moist.

A fourth step in our process consists in the firing of the set cement or "concrete". In many cases, this additional step of firing will be unnecessary as, for example, where the conditions of use insure that it will be heated to an adequate temperature to increase materially the strength of the product. However, this additional step of firing is always desirable, since it greatly increases the strength of the product. It is particularly desirable in the making of comparatively small units such as blocks or bricks of the cement or of the "concrete".

In the making of small pieces of the cement, we have used the following procedure: The powder and water were mixed and poured into suitable molds and allowed to stand about 48 hours. In some cases 24 hours were employed, and in others, longer than 48, but 48 is satisfactory. The piece was then dried to prevent cracking during heating. When dry, the piece was inserted into a furnace and heated to the required temperature. In practice it would be preferable to heat the material slowly to prevent shrinkage cracks.

It has been found that, if these pieces are fired to a temperature of 2500° F., an extremely stable product results. This fired material will withstand extreme slaking tests and will also withstand severe spalling tests. For example, the material may be dropped from a temperature of 2500° F. into a pan of cold water without cracking or disintegrating.

The length of time that the piece should be held at 2500° F. will vary with the size of the piece. Cylindrical pieces of 1" in diameter and 1" in height have been given the required strength by being merely brought to 2500° F. Stability may be reached at as low a temperature as 2400° F. but we prefer to fire it at 2500° F. It will be understood that the firing temperature to be used depends somewhat upon the history of the clinker and upon the size of the unit being fired. In the case of the so-called "concrete" the firing temperature may be somewhat different from a similar unit made entirely of cement.

In a cylindrical sample of the set cement, 1" in diameter and 1" in height, we have found that the crushing strength is increased by firing to as much as 25,000 lbs./sq. in. The material is extremely hard and dense after firing. Cylinders exhibit a columnar breakage rather than an hour-glass breakage when broken under a compressive load.

One use for our invention is in the making of a basic brick. One method of effecting this is to grind the clinker so that it will have a wide variety of sizes, but enough powder for cementing. This can be moistened with water and extruded or pressed or shaped into brick form. After setting for 48 hours or longer, the piece may be then dried and fired. Using pressure in forming the brick and pursuing the above steps, we have made a very dense, heavy, hard material.

As another modification, bricks may be made from crushed dolomite clinker by following the procedure of the so-called dry process as used for fire-clay and other bricks.

Another practical application of this invention consists in the direct application of our cement mixture in an open-hearth furnace. One way of accomplishing this is by ramming or plastering the proper dolomite cement mixture onto the bottom of the open-hearth. The mass can then be kept moist from two to three days, and then dried. Fire can then be applied to make the hard, dense lining required. If particles of proper size have been selected, the formation of cracks will only occur rarely and, where they occur, these cracks will not be severe enough to be harmful.

As indicated previously, numerous metallurgical uses can be made of our cement, both in its unfired state and in its fired condition. Thus, it is applicable to linings for melting furnaces and ladles, crucibles, patching parts of furnaces, and, in fact, for all uses where refractory material is required to be placed in contact with molten metal, slags or glass.

It should be understood that it is within the boundary of our invention to produce our hydraulic cement by clinkering dolomite wherein the lime content is greatly reduced. As a matter of fact, we may find it desirable to produce our hydraulic cement from a stable magnesite clinker wherein the magnesite is mixed with suitable fluxes such as silica and iron or other oxides.

A modification of our invention has produced a slightly different product which is made of dolomite cement but which is cellular in character. We find we are able to accomplish this by several different methods.

The first method which we have tried consists in adding a small amount of raw ground dolomite (approximately 5%) to our dolomite cement and adding 1% $H_2SO_4$ instead of water. The reaction of this method may be written as follows:

$$MgCO_3 \cdot CaCO_3 + 2H_2SO_4 = MgSO_4 + CaSO_4 + 2H_2O + 2CO_2$$

The carbon dioxide gas formed in this reaction serves to bloat the product and to provide a multiplicity of air spaces or voids therein which remain in the product after setting, so that there results a product of greatly decreased density. It is to be understood that acids other than sulfuric may be used to produce this effect.

A similar bloating action may be effected by adding a small amount of zinc or aluminum powder (about 0.1%) to the cement and adding water in the usual manner. There is ordinarily enough free lime in the cement to make the metal powder react. This reaction may be written as follows:

$$CaO + 2Zn + 3H_2O = Ca(OZnOH)_2 + 2H_2.$$

If no free lime is present, bloating may be effected by adding dilute acid instead of water.

The cellular characteristics of the product may, however, be produced by foaming. This is preferably accomplished by mixing a foaming agent, such as saponin to water and agitating or beating it into a foam. The dolomite cement powder may then be added and stirred until a uniform product is obtained. This product may then be poured into a suitable mold and allowed to set, being kept moist during the setting period. As an example, of this particular method, we have used ¾ gm. saponin, 100 gms. water, and 200 gms. cement. The above ratios are given only as an example, since the amounts used will vary with the character of the product desired.

However, we may find it desirable to use other foaming agents instead of saponin.

The cellular product obtained by either of these three methods may then be fired to approximately 2500° F. or other suitable temperature, as previously indicated. This firing causes the material to become very hard, while it maintains its extreme lightness and its cellular characteristics. For many purposes, however, it is not necessary to fire the cellular product. For household and other insulation purposes, the unfired product may be used although, of course, the fired material can also be used for these purposes. It will readily be seen that this cellular material is an excellent heat insulator.

We are also able to produce a product which is formed as a unit structure, with one or more layers of materials of different density. For example, one layer may be of the heavy dense material made directly from our dolomitic cement and water and without any cellular characteristics and the other layer may be made in accordance with one of the methods described for producing cellular material. This may be accomplished, for example, by partially filling a mold with the heavier material and then completing the filling of the mold with the lighter bloated or foamed cellular material. Upon setting, the structure becomes a unitary one with one layer of dense material and another layer of cellular material.

The independent cellular units may be used as a basic lining of a furnace or other metallurgical apparatus. The dense part of the unit should be the inside lining of the furnace, since porous or cellular material should not be used in contact with molten materials owing to their lack of resistance to penetration and corrosion. The cellular portion acts as a basic refractory insulator and thus will reduce heat losses.

It will be seen from the above that we have provided a novel process in the art of making refractory materials and that, in conjunction with this invention, we have produced several novel products. Thus, we have provided a simple method for treating naturally occurring dolomite so as to obtain a highly desirable basic cement and that, in addition we have developed certain important products by the use of this basic cement in conjunction with other materials and process steps.

Since an ample supply of dolomite is always available at a low cost and since such fluxes as silica and iron or other metallic oxide are also readily available at a low cost, it will be seen that the raw materials which go to make up our cement are exceedingly cheap. The clinkering operation and the reduction of the clinkers to powdered form are rather low cost operations. Therefore, we have been able to produce a basic cement, which is much needed in the art, at a low cost.

In addition, our invention has resulted in the production of a basic material for metallurgical uses which is hydraulic in its nature. Being hydraulic, it does not require a binder that lowers its fusion point. Thus, it dispenses with a drawback which has been quite common in the production of furnace linings and similar products, namely, the necessity for using a binder such as those inorganic binders which are commonly used in the lining of furnaces with alundum, chrome or mullite cements which binders lower the fusion point, and which are often destroyed in service.

It will also be apparent that we have provided a basic material for lining melting furnaces and for like service which will dispense with the necessity for using refractory brick or crushed rammed refractories with binders.

It will also be seen that we have provided a substitute for magnesite brick and similar products. Magnesite brick tends to spall badly, if heated or cooled rapidly, and is also quite expensive. Our material is substantially free from tendency to spall and will be quite cheap.

It will likewise be noted that our product is superior to granular magnesite, raw dolomite and calcined dolomite. For one thing, it has been the common practice to sinter such materials into place at high temperatures, often with slag and other agents, to cause them to fuse in place or set. Sometimes tar, clay, sodium silicate or other binders have been used with calcined or electrically fused magnesite or calcined dolomite. Our product is not only superior in its inherent characteristics and more adherent than materials of the type indicated, but it may be applied as a plaster at low temperatures so as to produce a monolithic structure of a basic nature.

In short, we have provided a basic cement which is highly refractory and particularly suitable for high temperatures. Moreover, this cement requires no extraneous binder, since it is hydraulic and will set firmly in place merely by the addition of water. Furthermore, it is of such a nature that it lends itself readily to the production of formed units while, at the same time, it may be mixed with other materials such as coarse particles of magnesium oxide or coarse dolomite clinker and formed into a unitary or monolithic structure. It is especially suitable for use at high temperatures and this quality can be very greatly enhanced by the additional firing step described.

In addition to the fact that our dolomite cement possesses these highly desirable characteristics, it makes possible the production of a porous or cellular basic refractory material which is much needed in the metallurgical industry. Moreover, our invention involves the actual making of such a product and methods for making such a product which is, at the same time, of low density and high strength.

It will be obvious that a cellular refractory material of a basic nature is highly advantageous. In the first place, it possesses heat insulating characteristics particularly useful in the construction of furnaces and similar units. Furthermore, being basic in its nature, it may be placed in contact with the inner basic lining of a furnace without danger of fluxing the inner lining as would be the case if a cellular acidic refractory insulator was used.

Though our invention is described primarily for use in connection with the metallurgical industry, it will be obvious that it is applicable to the chemical and other industries as well. It is also obvious that we have produced a hydraulic cement which may be used as such at ordinary temperatures. In short, it may be used in nearly any place that Portland cement is now used. Products of the hydraulic cement to be used at ordinary temperatures may be made from the finely ground powder alone, or coarser material may be incorporated with the powder. For use at ordinary temperatures, one may even employ sand and gravel as the coarse materials.

In the claims following, the term "iron oxide" is used in a general sense, and as indicated in the foregoing specification aluminum, chromium, manganese or similar metal oxides may be substituted in substantially equivalent amounts for the iron oxide. If aluminum oxide is used instead of ferric oxide, calcium aluminate is formed instead of calcium ferrite.

Having thus described our invention, what we claim is:

1. The method of producing a hydraulic cement which comprises selecting a clinker formed by firing a mixture of a calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting, and reducing said clinker to powdered form to produce a hydraulic cement.

2. The method of producing a refractory material which comprises selecting a clinker formed by firing a mixture of a calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting, reducing said clinker to powdered form to produce a hydraulic cement, and adding water to set such cement.

3. The method of producing a refractory material which comprises selecting a clinker formed by firing a mixture of a calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker which is stable against slaking and dusting, reducing said clinker to powdered form to produce a hydraulic cement, adding water to set such cement, and firing the set material to a minimum temperature of 2400° F.

4. The method of producing a refractory material which comprises selecting a clinker formed by firing a mixture of dolomite, silica, and a metal oxide fluxing agent selected from the group comprising an oxide of iron, aluminum, manganese, chromium, the silica in said mixture being present in an amount of from 6% to 9% and the metal oxide fluxing agent being present in an amount from 2% to 5%, at such a temperature and for such a period of time as to produce a clinker consisting primarily of periclase, tricalcium silicate and a calcium salt in which the oxide of the fluxing agent is the acid radical thereof which is stable against slaking and dusting, and reducing said clinker to powdered form to produce a hydraulic cement.

5. The method of producing a refractory material which comprises selecting a clinker formed by firing a mixture of dolomite, silica, and a metal oxide fluxing agent selected from the group comprising an oxide of iron, aluminum, manganese, chromium, the silica in said mixture being present in an amount of from 6% to 9% and the metal oxide fluxing agent being present in an amount from 2% to 5%, at such a temperature and for such a period of time as to produce a clinker consisting primarily of periclase, tricalcium silicate and a calcium salt in which the oxide of the fluxing agent is the acid radical thereof which is stable against slaking and dusting, reducing said clinker to powdered form to produce a hydraulic cement, and adding water to set such cement.

6. The method of producing a refractory material which comprises selecting a clinker formed by firing a mixture of dolomite, silica, and a metal oxide fluxing agent selected from the group comprising an oxide of iron, aluminum, manganese, chromium, the silica in said mixture being present in an amount of from 6% to 9% and the metal oxide fluxing agent being present in an amount from 2% to 5%, at such a temperature and for such a period of time as to produce a clinker which is stable against slaking and dusting, reducing said clinker to powdered form to produce a hydraulic cement, adding water to set such cement, and firing the set material to a minimum temperature of 2400° F.

7. The method of producing an article of manufacture which comprises mixing with coarser particles of material a cement formed by reducing to powdered form a clinker which has been produced by firing a mixture of calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting, and adding water to set such cement and bind the coarser particles together.

8. The method of producing an article of manufacture which comprises mixing with coarser particles of material a cement formed by reducing to powdered form a clinker which has been produced by firing a mixture of calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker which is stable against slaking and dusting, adding water to set such cement and bind the coarser particles together, and firing the set material to a minimum temperature of 2400° F.

9. A refractory material comprising a cement formed by finely dividing a stable clinker obtained by firing a mixture of a calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting.

10. A refractory material comprising a cement formed by finely dividing a stable clinker obtained by firing a mixture of a calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting, and which has been set by hydrolysis and fired.

11. A refractory material comprising a cement formed by finely dividing a stable clinker obtained by firing a mixture of a calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker which is stable against slaking and dusting, and which has been set by hydrolysis and fired.

12. A refractory material comprising a cement formed by finely dividing a stable dolomite clinker obtained by firing a mixture of dolomite, silica, and a metal oxide fluxing agent selected from the group comprising an oxide of iron, aluminum, manganese, chromium, the silica in said mixture being present in an amount from 6% to 9% and the metal oxide fluxing agent being present in an amount from 2% to 5%, at such a temperature and for such a period of time as to produce a clinker consisting primarily of periclase, tricalcium silicate and a calcium salt in which the oxide of the fluxing agent is the acid radical thereof which is stable against slaking and dusting.

13. A refractory material comprising a cement formed by finely dividing a stable dolomite clinker obtained by firing a mixture of dolomite, silica, and a metal oxide fluxing agent selected from the group comprising an oxide of iron, aluminum, manganese, chromium, the silica in said mixture being present in an amount from 6% to 9% and the metal oxide fluxing agent being present in an amount from 2% to 5%, at such a temperature and for such a period of time as to produce a clinker which is stable against slaking and dusting, and which has been set by hydrolysis and fired.

14. A hydraulic cement made by reducing to powdered form a stable clinker obtained by firing a mixture of a calcareous magnesium carbonate material, silica and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting.

15. A hydraulic cement made by reducing to powdered form a stable clinker obtained by firing a mixture of dolomite, silica, and a metal oxide fluxing agent selected from the group comprising an oxide of iron, aluminum, manganese, chromium, the silica in said mixture being present in an amount of from 6% to 9% and the metal oxide fluxing agent being present in an amount from 2% to 5%, at such a temperature and for such a period of time as to produce a clinker consisting primarily of periclase, tricalcium silicate and a calcium salt in which the oxide of the fluxing agent is the acid radical thereof which is stable against slaking and dusting.

16. An article of manufacture comprising coarser particles of material mixed with a cement formed by finely dividing a stable clinker obtained by firing a mixture of calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker consisting primarily of periclase, tricalcium silicate and a calcium salt in which the oxide of the fluxing agent is the acid radical thereof which is stable against slaking and dusting, and then setting said cement by hydrolysis.

17. An article of manufacture comprising coarser particles of material mixed with a cement formed by finely dividing a stable clinker obtained by firing a mixture of calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker which is stable against slaking and dusting, setting said cement by hydrolysis and then firing.

18. The method of producing an article of manufacture which comprises mixing with coarser particles of material a cement formed by reducing to powdered form a clinker which has been produced by firing a mixture of calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker which is stable against slaking and dusting, and firing the material to a minimum temperature of 2400° F.

19. An article of manufacture comprising coarser particles of material mixed with a cement formed by finely dividing a stable clinker obtained by firing a mixture of calcareous magnesium carbonate material, silica, and a metal oxide fluxing agent, the silica in said mixture being present in an amount of from 5% to 11% and the metal oxide fluxing agent being present in an amount of from 0.5% to 15%, at such a temperature and for such a period of time as to produce a clinker which is stable against slaking and dusting, and then firing.

CLYDE E. WILLIAMS.
JOHN D. SULLIVAN.